(12) United States Patent
Arthur et al.

(10) Patent No.: US 7,881,235 B1
(45) Date of Patent: Feb. 1, 2011

(54) MIXED MEDIA CONFERENCING

(75) Inventors: Bruce Arthur, Palo Alto, CA (US);
Marcel VanOs, San Francisco, CA (US);
Stephen O Lemay, San Francisco, CA (US);
Greg Christie, San Jose, CA (US);
Peter Westen, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 1416 days.

(21) Appl. No.: 10/877,507

(22) Filed: Jun. 25, 2004

(51) Int. Cl.
*H04L 12/16* (2006.01)
*H04Q 11/00* (2006.01)

(52) U.S. Cl. .................. 370/261; 379/202.01; 709/204; 709/227

(58) Field of Classification Search ................ 370/261; 379/202.01; 709/204, 227
See application file for complete search history.

(56) References Cited

U.S. PATENT DOCUMENTS

| | | | |
|---|---|---|---|
| 5,793,365 A * | 8/1998 | Tang et al. | 715/758 |
| 5,854,893 A | 12/1998 | Ludwig et al. | |
| 6,237,025 B1 | 5/2001 | Ludwig et al. | |
| 6,275,575 B1 * | 8/2001 | Wu | 379/202.01 |
| 6,351,762 B1 | 2/2002 | Ludwig et al. | |
| 6,583,806 B2 | 6/2003 | Ludwig et al. | |
| 7,124,166 B2 * | 10/2006 | Brown | 709/204 |
| 7,152,093 B2 | 12/2006 | Ludwig et al. | |
| 7,206,809 B2 | 4/2007 | Ludwig et al. | |
| 7,433,921 B2 | 10/2008 | Ludwig et al. | |
| 2005/0034079 A1 * | 2/2005 | Gunasekar et al. | 715/753 |
| 2005/0078172 A1 * | 4/2005 | Harville et al. | 348/14.09 |
| 2007/0005795 A1 * | 1/2007 | Gonzalez | 709/232 |
| 2007/0005804 A1 * | 1/2007 | Rideout | 709/246 |

OTHER PUBLICATIONS

Tang, John C. and Monica Rua, "Montage: Providing Teleproximity for Distributed Groups", *Proceedings of the Conference on Computer Human Interaction (CHI)* '94, Boston, MA, Apr. 1994, pp. 37-43.

Tang, J.C., Isaacs, E.A., & Rua, M. (1994). Supporting Distributed Groups with a Montage of Lightweight Interactions, *Proceedings of the Conference on Computer-Supported Cooperative Work (CSCW)* Chapel Hill, NC: ACM Press, 23-34.

* cited by examiner

*Primary Examiner*—Quynh H Nguyen
(74) *Attorney, Agent, or Firm*—Fenwick & West LLP

(57) ABSTRACT

Multiple users participate in a conference while taking maximum advantage of hardware and bandwidth capabilities of each participant. Each user's system makes known to a directory service its hardware sending and receiving capabilities. The directory service makes this information available to other users who may then wish to join a conference with the user. An initiating user sends invitations via the directory service to the remote users. Each user that accepts an invitation transmits its network address to the initiating user, who then establishes a peer-to-peer connection with each of the remote users. Each participant system exchanges information about hardware capabilities and bandwidth, and a conference manager determines a best model for connecting each of the participants. Depending on the hardware and bandwidth capabilities of the participants, the manager chooses from a duplicate streams model, a multicast model, and a host-among-peers model for connecting the participants.

21 Claims, 6 Drawing Sheets

MIXED MEDIA CONFERENCING

BACKGROUND OF THE INVENTION

1. Field of the Invention

The present invention relates generally to audio and video conferencing over a network. In particular, the present invention is directed to an efficient method for providing high-quality conferencing between multiple participants.

2. Description of the Related Art

Often, people wish to participate in a conference over a network. These conferences may include text, audio, video, application sharing, or some combination of the four. Frequently, the connections between the participants' conferencing systems are established to meet a lowest common denominator—that is, if some participants have video capability but others do not, the conference does not include video for any of the participants. In addition, where more than two participants are involved in a conference, a centralized server typically is required to act as an interface between the participants, with each of the conferencing systems receiving a feed from the server, resulting in latency and reduced quality. Finally, it is cumbersome in most instances to add a participant to an existing conference both because the new participant may not have the minimum hardware requirements to join the existing conference, and because the mechanism of inviting the user to the conference is itself tedious.

Accordingly, there is a need for a system and method for providing improved network conferencing that allows each user to participate at a level commensurate with her hardware and bandwidth characteristics without the need for a centralized server, and which additionally allows participants to be easily added and removed.

SUMMARY OF THE INVENTION

The present invention enables multiple users to participate in a multi-way conference in which each participant's conference system communicates with the others', and in which there is no requirement that each participant's conference system have the same hardware capabilities. Consequently, participants' conference systems can have any combination of audio, video, text, or the like, thereby taking advantage of the hardware and bandwidth capabilities of each participant.

In one embodiment, the present invention provides a communications methodology in which each participant's conference system is configured to take maximum advantage of its communications capability. Upon logging in to a directory service, each user's system makes known to the service its hardware sending and receiving capabilities, e.g., whether audio, video, text, etc., can be transmitted and/or received. The directory service makes this information available to other users who may then wish to join a conference with the user. When a user wants to initiate a conference with multiple users, the initiating user sends invitations via the directory service to the remote users. The conference system of each user that accepts an invitation then transmits its network address (or addresses, if it has more than one) to the initiating user's conference system, which then establishes a peer-to-peer connection with each of the remote users' systems. Each participant system automatically exchanges information about hardware capabilities and upstream and downstream bandwidth, and one of the participants' systems, which in one embodiment is the initiating system, is designated as a conference manager. The conference manager determines a best model for connecting each of the participants' systems. Depending on the hardware and bandwidth capabilities of the participants' systems, the manager chooses from a duplicate streams model, a multicast model, and a host-among-peers model for connecting the participants' systems. Once a conference is established, new participants can join the conference and existing participants can leave, and the conferencing method is automatically re-optimized. Thus, instead of all of the participants' conference systems operating at a lowest common level, each participant's conferencing system operates at a level that takes advantage of its hardware and bandwidth capabilities.

These features are not the only features of the invention. In view of the drawings, specification, and claims, many additional features and advantages will be apparent.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
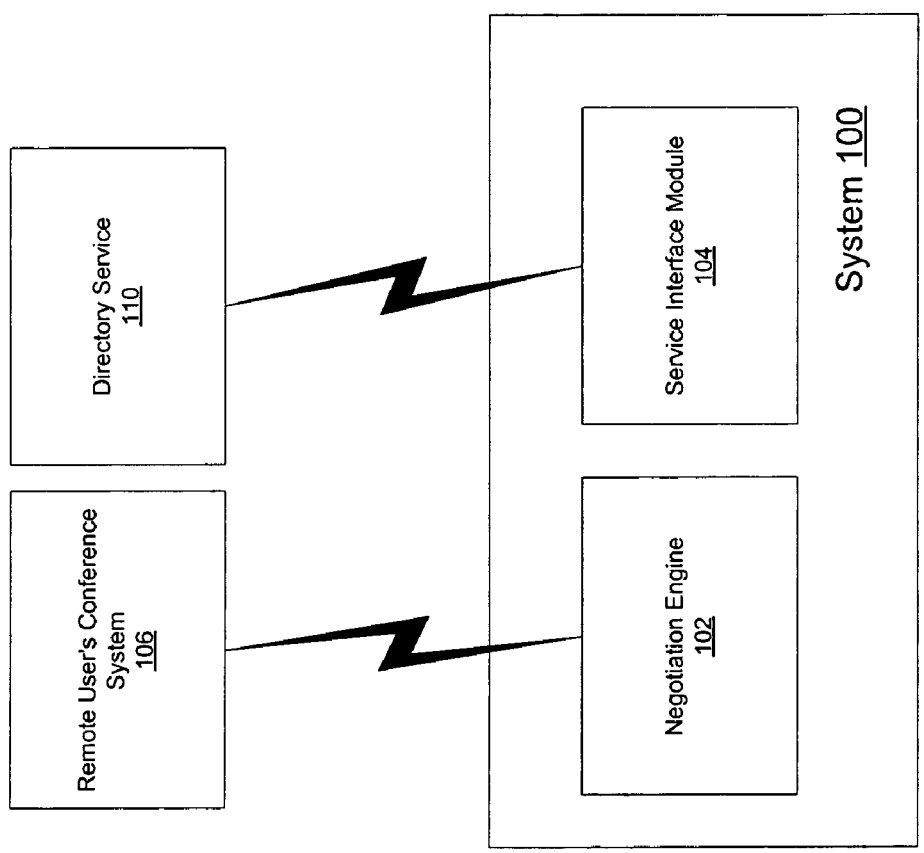
FIG. 1 is a block diagram illustrating a system for controlling multi-way conferences in accordance with an embodiment of the present invention.

Referring now to FIG. 1, there is shown a system 100 in accordance with an embodiment of the present invention. System 100 includes a negotiation engine 102 and a service interface module 104. Negotiation engine 102 coordinates multi-way conference sessions with remote users' conference systems 106 in a manner described below. Service interface module 104 is an interface between system 100 and directory service 110, also shown in FIG. 1. In one embodiment, system 100 exists as client software executing on a user's computer 202. As will be appreciated by those of skill in the art, system 100 could instead be executing on another device, for example a mobile telephone, PDA, etc., in a similar manner. Further, remote users 106 are also using a computer, telephone, PDA, etc., having a version of system 100 stored thereon, and operating in a manner similar to that described herein.

Figure 2:
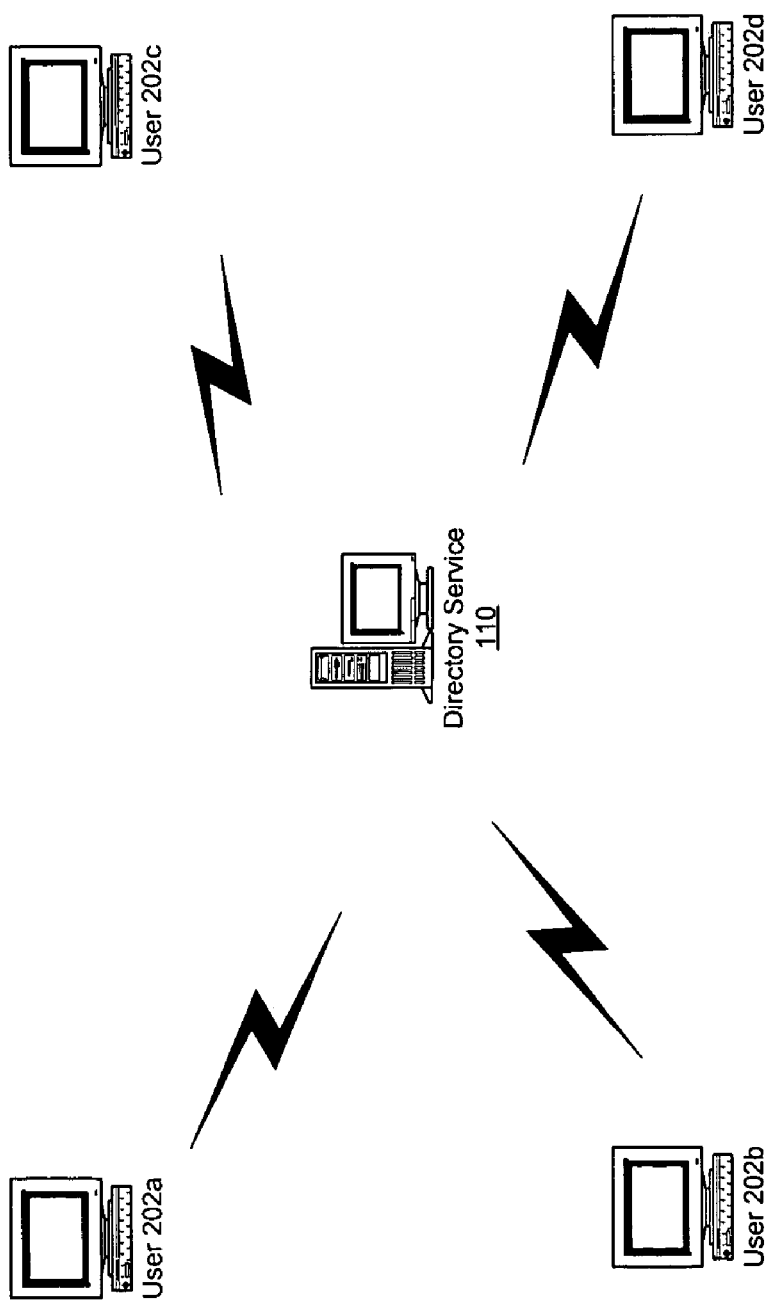
FIG. 2 illustrates a connection paradigm for connecting users' computers to a centralized directory service in accordance with an embodiment of the present invention.

FIG. 2 illustrates a typical connection paradigm in which users' computers 202 are connected to a centralized directory service 110. A user uses client software to log in to the directory service 110 and typically is able to view a list of other users currently using the service. In one embodiment, example client software is iChat AV, by Apple Computer, Inc. of Cupertino, Calif.; and the directory service 110 is AIM instant messaging by America Online, Inc., of Dulles, Va. In the example of FIG. 2, four user's computers are logged in to directory service 110, and none is yet participating in a conference.

Figure 3:
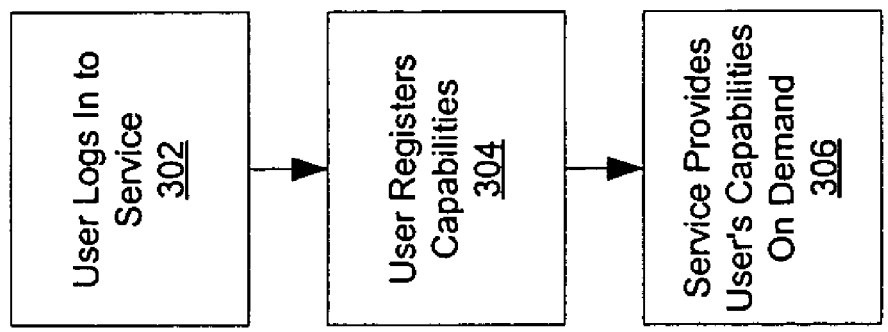
FIG. 3 is a flow chart illustrating a method for registering a user's conferencing level with a communications server in accordance with an embodiment of the present invention.

Referring now to FIG. 3, when a user of system 100 initially logs in 302 to directory service 110, service interface module 104 registers 304 the conferencing capabilities of system 100 with service 110. In a preferred embodiment, service interface module 104 initially registers the receiving capabilities of system 100, and then indicates the transmitting capabilities of system 100. For example, a particular system 100 may have a microphone and no video camera, although it is capable of displaying any video that it receives. Accordingly, service interface module 104 transmits this information to service 110, which makes 306 the information available to other users of service 110—in one embodiment making the information available on demand, and in an alternative embodiment, providing it globally. In this manner, users of service 110 can easily see which capabilities are supported by other users and can use this information to select participants for a conference. For example, a first user may want to initiate a conference only with other users having systems that can support audio conferencing.

Figure 4:
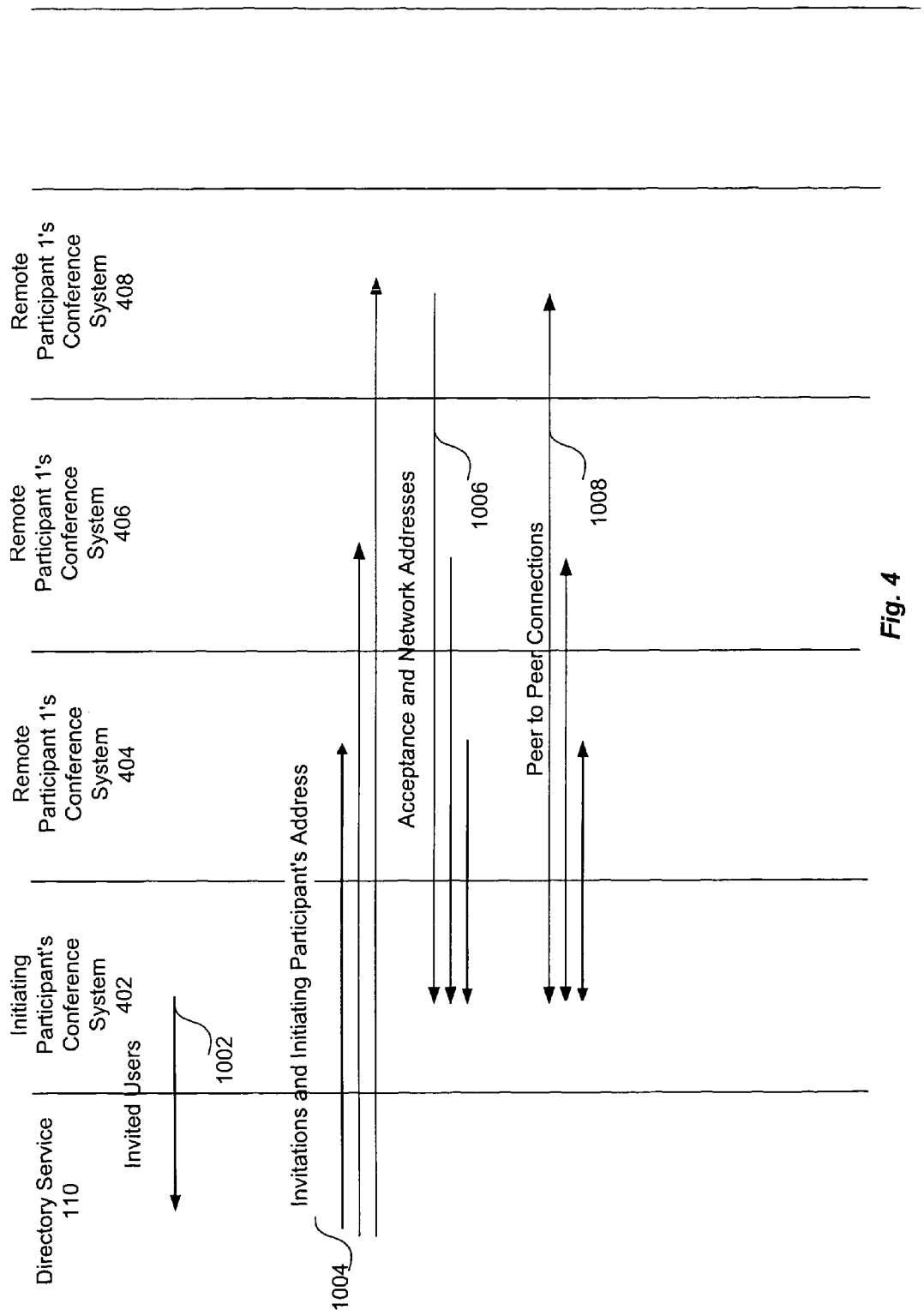
FIG. 4 is an interaction diagram illustrating the establishment of peer-to-peer conferencing connections in accordance with an embodiment of the present invention.

Referring now to FIG. 4, to initiate a conference a participants' conference system 402 send 1002 invitations to directory service 110, 'Which in turn forwards 1004 the invitations to remote participants' systems 404, 406, 408. In one embodiment, the invitation includes a network address, e.g., a IP address of the initiating participant's system 402.

When the invited users are notified by their conference systems 404, 406, 408 of the invitation, they can choose to accept or decline the invitation. If a user declines, then a message is returned to the initiating participant's conference system. If the invited user does accept the invitation, then the network address of that user's conference system is transmitted 1006 to the initiating participant's system 402 along with the acceptance. Using the received address, the initiating participant's conference system 402 then directly contacts the invited user and establishes 1008 a peer-to-peer connection. Alternatively, or if the attempt by the initiating participant's system to establish the connection is unsuccessful, the invited users' systems attempt to initiate the connection using the initiating participant's network address. The peer-to-peer connections for each user in the conference can be established in a variety of ways, and as further explained below.

Because many user conference systems are located behind a firewall, router, or other network device that obscures the true IP address of the system, in one embodiment participants' systems transmit more than one network address with an invitation or invitation response. For example, if a conference system of a user sending an invitation to a remote user's system is behind a router doing network address translation (NAT), the user's system may have an IP address assigned by the router, e.g., 192.168.1.2. To conference systems not behind the router, however, the user's system appears to have the IP address of the router, e.g., 64.81.55.103. Accordingly, the inviting user's conference system sends both 192.168.1.2 and 64.81.55.103 to the remote user's system. If the remote user's system has an external IP address that is the same as the external address of the inviting user's system, in this example 64.81.55.103, then the systems of the remote user and the inviting user are on the same network, and private IP addresses, i.e. 192.168.1.2 will be used. Otherwise, the external IP address for each user's system will be used.

Figure 5:
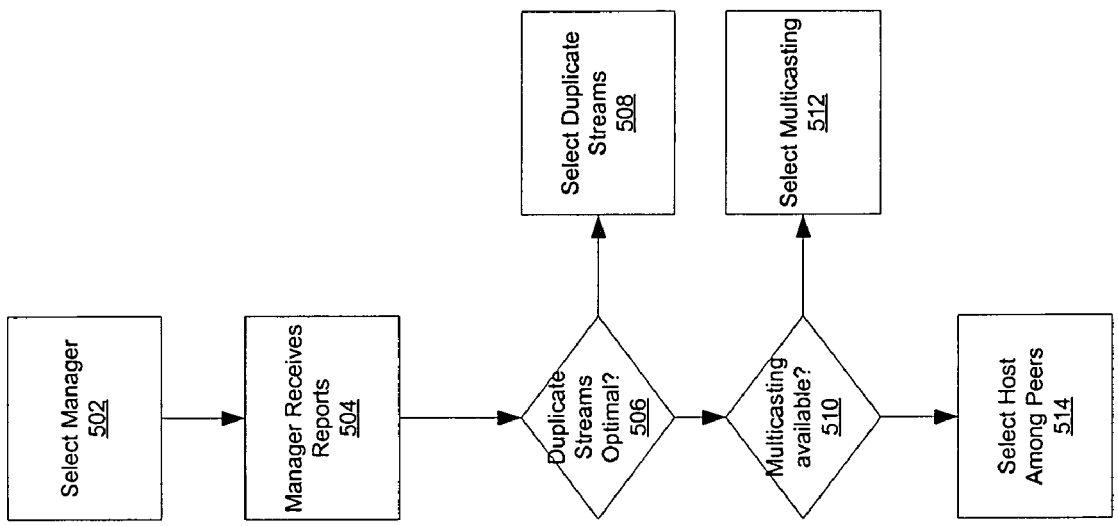
FIG. 5 is a flow chart illustrating a method for selecting a conference method in accordance with an embodiment of the present invention.

FIG. 5 is a flowchart illustrating a process by which a communications model is selected. Initially, the conference system of one of the conference participants is selected 502 to be an arbiter, or manager, of the conference. In one embodiment, the initiator of the conference request, i.e. the system from which the chat request originated, is designated as the manager. In an alternative embodiment, a manager is selected at random, or according to some predetermined heuristic— e.g., the conference system with the highest IP address in the first octet is designated as the manager. Those of skill in the art will appreciate that the exact manner in which the manager is appointed is not significant—it is sufficient that a manager is designated. Next, each participant's system reports 504 its capabilities to the manager's negotiation engine 102. In one embodiment, capabilities reported include the participant's bandwidth (upstream and downstream) and hardware capabilities for both sending and receiving. A participant's conference system can determine its bandwidth in a variety of conventionally-known ways, such as by sending a request to a remote server and receiving a bandwidth report from that server. Hardware capabilities, as noted above, include whether a participant's conference system can transmit and/or receive text, audio, or video. Based on the conference system reports, the manager determines which model to select for connecting the participants' systems.

In an environment where 506 all conference systems have very high bandwidth, the manager selects 508 a "duplicate streams" model. In a duplicate streams model, each participant's system transmits to each other system. That is, if there are four participants, each sending and receiving video, then 12 streams are being transmitted in total. Because of the bandwidth required for full motion video, the manager will typically disfavor the duplicate streams model in the absence of very high available bandwidth.

Alternatively, if 510 the participants' systems are part of a network that supports multicasting, such as, for example, where all participants are part of the same subnet, a multicast model is selected 512 by the manager. In a multicast model, a single transmitted stream is broadcast by each participant's system to multiple addresses, in this case the other participants. Again, if four participants are sending and receiving video, only four streams are required, as compared to the 12 streams sent in the duplicate streams model.

In a third model, one of the participants' systems—not necessarily the manager—is designated 514 to be a host. Preferably, the participant's system with the highest upstream bandwidth is designated to be the host; in an alternative embodiment, the participant's system with the most CPU power is the host. In this hosted model, each participant's system sends its stream to the host, which then amalgamates the streams and transmits them back to all of the participants. In a preferred embodiment, prior to sending an amalgamated stream to a recipient, the host blacks out that recipient's video in order to save bandwidth, since the recipient system does not need to receive its own video.

In one embodiment, each participant's system is scored by the manager according to its capabilities, e.g., bandwidth, hardware capability, etc. The participant's system that receives the highest score is appointed host. In the case of a tie, the host may be selected randomly from among the tying participants, or by some other selection method, e.g., the host with the highest IP address.

Because it is often the case that at least some participants will have lower bandwidth than others, assigning the participant with the highest upstream bandwidth to be the host among peers effectively leverages the bandwidth that is available in order to ensure the richest possible conference experience for all users, instead of preventing users with lower available bandwidth or missing hardware from participating at all.

Figure 6:
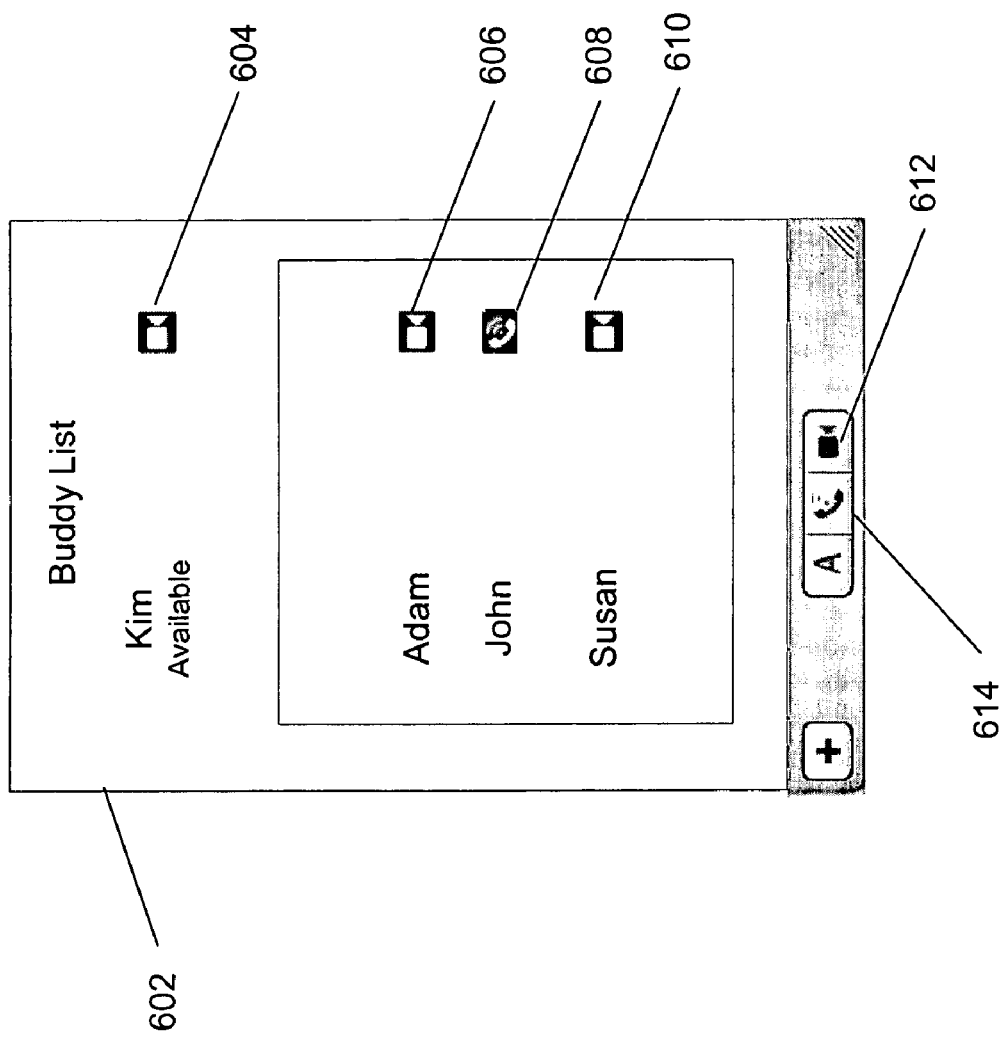
FIG. 6 is example of a buddy list in accordance with an embodiment of the present invention.

An advantage of the present invention is that participants can freely join conferences with other participants without having to make decisions about how to set up the conference, which system should be a host, and the like. System 100 allows the participant to simply indicate that she wants to participate in a conference, and system 100 implements the necessary connections between the various participant's conference systems automatically, while allowing each participant to participate at the level supported by that user's hardware and bandwidth. For example, and referring now to FIG. 6, consider a user with a buddy name of "Kim". Kim is logged in to directory service 110, and has displayed a buddy list 602. Kim has a microphone and video camera attached to her computer. Kim's status indicator 604 accordingly indicates that Kim's conference system can transmit video. As can be seen from Kim's buddy list 602, her buddies Adam, John and Susan are currently signed in to directory service 110, and while Adam 606 and Susan 610 have systems that can broadcast video, John 608 can only broadcast audio, as symbolized by the audio icon 608.

Kim has a number of options for initiating a conference. In one embodiment, she selects the desired participants in her buddy list, and presses the "video" 612 or "audio" 614 buttons at the bottom of the list 602. Alternatively, she can start a video or audio conference with one person, and then drag an additional buddy into the conference window. Alternatively, she can start a video or audio conference with one person, and then select an additional buddy and click on their camera or phone icon. In another embodiment, Kim can start a video or audio conference with one person, and then use a "+" or similar button in the audio or video conference window to see a menu of available people to add.

Even though John's system has only broadcast audio capability and not video capability, he is still able to participate in the conference with Kim, Adam and Susan—he can still receive their video signals, but they will receive audio only from him. Assume also that of all participants, Susan's system has the highest upstream bandwidth, and the remaining participants have bandwidth of varying quality. In a preferred embodiment, after Kim invites the three other users to participate in a conference with her, they accept the invitation their systems transmit their IP addresses to Kim's conference system. Kim's conference system establishes a peer-to-peer connection with the remote users' systems, and because Kim was the initiating user, her conference system acts as manager, surveying the hardware capabilities and bandwidths of the conference participants. Because it is not the case that all participants have very high bandwidth, the duplicate streams model is not selected. Also, because the participants are not on the same subnet, packet multicasting is not available. Accordingly, Kim's system determines that a host-among-peers model is the best solution. Since Susan has the highest upstream bandwidth, her conference system is designated to be the host, and each participant is notified of the determination. Adam and Kim then begin transmitting video to Susan, while John transmits audio to Susan. Susan's conference system amalgamates the streams and sends the amalgamated streams to Adam, Kim and John, removing each recipient's transmission before sending them the combined stream. In this manner, everyone participates in the conference to the maximum degree supported by their configuration.

Assume now that Susan decides to leave the conference. Kim's system remains the manager, and now reoptimizes the conference according to the remaining participants' capabilities. For example, if John's system has the highest upstream bandwidth of the remaining participants, it will become the host. Note that this is possible even though John's system itself is not originating video. Once the new model for the conference is determined, it is preferably implemented automatically, requiring no user intervention. In one embodiment, the change from one host to the next happens after the departing host, Susan in this case, indicates her intention to leave the conference, but before she actually departs—allowing a seamless transfer.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the negotiation engine 102, service interface module 104, and so forth may be provided in many or one module.

Some portions of the above description present the feature of the present invention in terms of algorithms and symbolic representations of operations on information. These algorithmic descriptions and representations are the means used by those skilled in the network conferencing arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer implemented method for holding a teleconference between a plurality of users, the method comprising:
   inviting a plurality of users to join a conference, each user having a conferencing system with associated hardware capabilities and associated bandwidth capabilities, and each conferencing system having a maximal communication capability supported by the associated bandwidth and hardware capabilities associated with the conferencing system;
   receiving from each invited user a user address;
   establishing a connection with each invited user using the received user address;
   selecting a conferencing method from a plurality of conferencing methods, wherein the conferencing method is selected based on the maximal communication capabilities of the conferencing systems of the invited users; and
   establishing a conference between the invited users according to the selected conferencing method, wherein the selected conferencing method allows each invited user to participate in the conference at a level supported by each user's hardware capabilities and associated bandwidth capabilities and conferencing streams are transmitted using the selected conferencing method.

2. The method of claim 1 wherein the conferencing method is a duplicate streams method, wherein invited users transmit conferencing streams to each other's conferencing system.

3. The method of claim 1 wherein the conferencing method is a multicast streams method, wherein a conferencing stream is broadcasted by an invited user to multiple other recipients.

4. The method of claim 1 wherein the conferencing method is a host-among-peers method, wherein a selected host receives conferencing streams from a plurality of peers and sends amalgamated conferencing streams to the peers.

5. The method of claim 4 wherein a conference system having a highest associated bandwidth capability is selected as a host among peers.

6. The method of claim 4 wherein hardware capabilities include a processor speed, and a conference system having a highest processor speed is selected as a host among peers.

7. The method of claim 1 wherein the associated hardware characteristics include microphone transmission capability.

8. The method of claim 1 wherein the associated hardware characteristics include video transmission capability.

9. The method of claim 1 wherein at least one user's associated hardware characteristics include video transmission capability and at least one user's associated hardware characteristics do not include video transmission capability.

10. The method of claim 1 wherein at least one user's associated hardware characteristics include audio transmission capability and at least one user's associated hardware characteristics do not include audio transmission capability.

11. The method of claim 1 further comprises automatically re-optimizing the selected conferencing method responsive to an existing user leaving the conference or a new user joining the conference.

12. A computer implemented method of configuring a teleconference between a plurality of conferencing systems, the method comprising:
   determining for each conferencing system an associated bandwidth, and available communication capabilities;
   selecting for each conferencing system a conferencing method for connecting the conferencing system from a plurality of conferencing methods based on a maximal communication capability supported by the associated bandwidth and hardware capabilities associated with the conferencing system; and
   configuring each of the conferencing systems to communicate with the other conferencing systems using the selected conferencing method, wherein the selected conferencing method allows a conferencing system to participate in the conference at a level supported by the conferencing system's maximum communication capability.

13. A system for holding a teleconference between a plurality of users, the system comprising:
   a service interface module for:
      establishing a connection with a directory service;
      inviting a plurality of users to join a conference, each user having a conferencing system with associated hardware capabilities and associated bandwidth capabilities, and each conferencing system having a maximal communication capability supported by the associated bandwidth and hardware capabilities associated with the conferencing system;
   a negotiation engine, communicatively coupled to the service interface module, for:
      receiving from each invited user a user address;
      establishing a connection with each invited user using the received user address;
      selecting a conferencing method from a plurality of conferencing methods, wherein the conferencing method is selected based on the maximal communication capabilities of the conferencing systems of the invited users; and
      establishing a conference between the invited users according to the selected conferencing method, wherein the selected conferencing method allows each invited user to participate in the conference at a level supported by each user's hardware capabilities and associated bandwidth capabilities and conferencing streams are transmitted using the selected conferencing method.

14. The system of claim 13 wherein the conferencing method is a duplicate streams method, wherein invited users transmit conferencing streams to each other's conferencing system.

15. The system of claim 13 wherein the conferencing method is a multicast streams method, wherein a conferencing stream is broadcasted by an invited user to multiple other recipients.

16. The system of claim 13 wherein the conferencing method is a host-among-peers method, wherein a selected host receives conferencing streams from a plurality of peers and sends amalgamated conferencing streams to the peers.

17. The system of claim 13 wherein the associated hardware characteristics include microphone transmission capability.

18. The system of claim 13 wherein the associated hardware characteristics include video transmission capability.

19. The system of claim 13 wherein at least one user's associated hardware characteristics include video transmission capability and at least one user's associated hardware characteristics do not include video transmission capability.

20. The system of claim 13 wherein at least one user's associated hardware characteristics include audio transmission capability and at least one user's associated hardware characteristics do not include audio transmission capability.

21. The system of claim 13 wherein the negotiation engine is configured to automatically re-optimize the selected conferencing method responsive to an existing user leaving the conference or a new user joining the conference.

* * * * *